Patented Apr. 23, 1935

1,999,147

UNITED STATES PATENT OFFICE 1,999,147

DRILLING WELL AND WELL DRILLING FLUID

Henry A. Ambrose and Albert G. Loomis, Pittsburgh, Pa., assignors to Gulf Research & Development Corporation, Wilmington, Del., a corporation of Delaware No Drawing. Application June 25, 1934, Serial No. 732,353

7 Claims. (Cl. 255—1)

This invention relates to drilling wells and well drilling fluids; and it comprises an improved method of drilling oil and gas bores or wells through strata with the aid of a mud fluid circulated around the drill and through the well bore, said mud fluid comprising solids in liquid suspension, wherein the mud is treated with a modicum of a neutral soluble organic chemical agent adapted to reduce the surface tension of the liquid of the mud, the mud fluid is pumped into the well, around the drill and up and out of the well through the bore, carrying entrained gas together with entrained solid matter, the mud fluid is then freed of entrained gas and solid matter by passing it through a settling zone where pressure on the fluid is reduced to atmospheric and where gas escapes freely on account of the reduction of surface tension in the mud fluid and solids settle out and the fluid is then returned to the well for reuse freed of gas; and it further comprises an improved well drilling fluid comprising solid matter in liquid suspension containing a modicum of a material adapted to reduce the surface tension of the liquid and usually comprising a neutral oxygen-containing water soluble organic material of the class known as "volatile solvents", said fluid allowing gas to readily extricate itself upon simply releasing pressure from the mud; all as more fully hereinafter set forth and as claimed.

In drilling wells for oil and gas by reciprocating or rotary methods it is customary to circulate a fluid through the well and around the drill during the drilling operation. The use of a fluid is particularly desirable in rotary drilling. While the fluid may be plain water, it is more usual to employ an aqueous suspension of solid matter, such as clay, bentonite, etc. Mud fluids have several well recognized functions. They serve to lubricate and cool the drill; to deposit solid or gelatinous matter on the bore walls, sealing crevices and pores and thus preventing loss of fluid into the formation adjoining the bore; and to carry up drill cuttings and sand to the surface for removal.

There is another function of fluids which in some cases is the most important of all. This is the prevention of the escape of gas from the well. Many oil formations are associated with gas formations, and gas tends to enter the well under pressures which may be very high. When the bore is filled with fluid, the column of fluid exerts a hydrostatic pressure in the well, the pressure corresponding to the density of the fluid (weight per unit volume) and the height of the column. This hydrostatic pressure head on the subsurface strata containing oil and gas, or gas alone, prevents to a greater or less degree the escape of gas and oil into the well while it is being drilled. At a given depth the greater the density of the fluid the greater the hydrostatic head. It is mainly for this reason that muds, rather than plain water, are used as drilling fluids. For best results the density of the fluid should be originally as high as possible, and should be so maintained. In some cases the material in suspension in the fluid comprises a substantial proportion of barytes, hematite, or other heavy material, to secure high density.

When the bore penetrates a stratum containing gas under high pressure the drilling fluid dissolves more or less gas. As the fluid travels upward in the bore towards the surface under pump action, the pressure in the fluid column gradually drops and the dissolved gas is released, forming bubbles permeating the fluid. This contamination of the fluid with gas is called "gas cutting" and is undesirable, because it results in lowering the effective density (mass per unit volume) of the fluid, and thus decreases the hydrostatic head of the column of fluid in the well. When gas cutting occurs even to only a slight extent, it is essential that the gas bubbles be released as completely as possible when the mud fluid reaches the surface, before the fluid is returned to the well, in order that the fluid may not become further gas-cut during the next cycle through the well. Unless gas is removed, gas cutting is aggravated in each recycling of the mud and may proceed to a degree where the pressure exerted by the gas in the gas-bearing stratum exceeds the pressure due to the hydrostatic head of the column of gas-cut fluid above the stratum. The result may be, and often is, a "blow-out"; mud is forcibly blown from the well. This may result in a serious fire if the gas becomes ignited, and the derrick and pumping equipment may be damaged or destroyed by the escaping gas or by rocks and sand blown from the well.

The extent of gas cutting is conveniently described or evaluated quantitatively as the difference in density of a gallon of fluid, in pounds per gallon, before and after gas cutting has taken place. For example, a normal gas-free mud fluid may weigh 12.5 pounds per gallon, and the density be reduced to 10 pounds per gallon after gas cutting by reason of the gas bubbles disseminated through the fluid. In this case the amount of gas cutting is said to be 2.5 pounds per gallon.

When plain water is used as a drilling fluid, the problem of gas cutting is not serious. However, water is of only restricted utility as a drilling fluid, on account of its low density (8.3 pounds per gallon) and muds, which are considerably denser than water (they may weigh 17 or more pounds per gallon), are also correspondingly thicker and less mobile. Gas bubbles escape less readily, and in some cases may remain in the mud fluid even after violent mechanical agitation. Even if the nature of the mud is such that natural extrication of the entrained gas is delayed but a few hours, operating conditions may be such that gas-cut mud is pumped back into the well where further gas cutting occurs.

Various mechanical methods have been proposed for freeing the pumped-out mud from gas; and at the same time, freeing it from entrained sand and cuttings. Long settling troughs assist in the extrication, but some of the gas may not separate from muds even after long settling times. Vibrating screens help; but these are costly and are not entirely satisfactory.

The achieved object of the present invention is to treat any kind of aqueous mud fluid so that entrained gas is quickly and readily extricated simply upon releasing pressure.

In a copending application of Lawton et al, Ser. No. 717,850, filed March 28, 1934, is disclosed a method of improving clayey well drilling fluids wherein the liquidity of the fluid is increased and the resistance to shearing stresses reduced by treatment with certain chemical reagents. The treatment allows small particles of foreign solid matter, which may remain suspended indefinitely in ordinary muds, to settle out rapidly; and allows gas bubbles to extricate themselves more readily, for the same reasons. The yield point of the fluid is reduced to a very low value, and the small particles and gas bubbles, which can only exert minute dropping and rising forces, respectively, are able to overcome the shear resistance of the fluid and escape. The surface tension of the mud is not measureably affected by the treatment.

We have now discovered that release of gas from any mud fluid, whether of a clay, bentonite or other mineral matter base, is greatly facilitated, probably because of lowering the surface tension, if the mud is treated with small amounts of certain oxygen-containing neutral water soluble organic substances of the class ordinarily called "volatile solvents"; the "alcoholic type liquids" such as the alcohols themselves, the esters and the ketones. All these reduce the surface tension of the water in the mud. However, certain water-soluble organic liquids not containing oxygen, such as certain alkylamines, may be used similarly and with similar advantage. We find it advantageous to employ neutral additions to the mud as these do not disturb the colloidal relations in the mud body. With the small additions of liquid which we contemplate, the general characteristics of the mud are not changed; the proportions are in general insufficient to appreciably affect any of the qualities of the fluid (e. g., viscosity, density, degree of deflocculation, etc.), except the surface tension of the water. Some drilling fluids have very low viscosities and yet gas-cut to a greater extent than certain other fluids having high viscosities. In each case, if our invention is applied to the mud fluid the surface tension is reduced and the ability of the fluid to release entrained gas is enhanced, while the viscosities and other properties are not changed to any measurable extent.

We believe that the most reasonable explanation of the action of our invention is that the addition of the surface tension reducing agents serves to increase the speed at which gas bubbles may rise through and escape from the mud fluid. The rate of rise of a bubble through a liquid is inversely proportional to the viscosity of the liquid, and is directly proportional to the surface area of the bubble (or to the square of the radius of the bubble). The larger the bubble, the faster it will rise. Other things being equal, the less is the surface tension, the greater is the radius of the bubble. Hence a reduction in surface tension causes some increase in radius of the bubble, and a greater increase in the rate of rise of the bubble; because of the fact that rate of rise is, as stated, proportional to the square of the bubble radius. Whatever may be the explanation, treatment of muds according to the present invention produces a remarkable increase in the rate of gas extrication, while not substantially affecting the other properties of the mud.

Among suitable agents for our purpose, ethyl acetate is one of the most useful and convenient, and is not costly in the amounts we use (generally not more than 1 to 2 per cent of the mud fluid by volume). Other suitable chemical agents include other esters beside ethyl acetate, such as ethyl or methyl formates or methyl acetate. Alcohols are suitable; such as ethyl, propyl and amyl alcohols. Acetone, a cheap and readily obtainable ketone, can be satisfactorily employed in the invention. Any of these substances added to aqueous mud fluids in small amounts bring about a reduction in surface tension. while not appreciably affecting the other properties; and they do not cause formation of froths or foams. Soaps in general reduce the surface tension of mud fluids to a certain extent, but they bring about the production of an abundant and lasting froth or foam, which adds difficulties in handling the fluids. Moreover they affect the colloidal qualities of the mud fluid. Soaps may increase the viscosity of a mud fluid to such an extent that gas cutting is actually increased over the value for the untreated mud. Other materials with which we have experimented lower surface tension, but have undesirable effects on the colloidal properties, including the viscosity, of mud fluids. In practicing the invention, any neutral material which effectively lowers the surface tension of the mud when added in small proportions may be used, provided the material does not cause undesirable effects, such as increase in viscosity of the fluid, or excessive foaming.

In practice, we usually add the chemical agent to the mud in the settling zone, advantageously near the pump intake. The agent is added in a proportion usually of 0.5 to 2 per cent by volume of the total mud fluid in well and settling zone. The exact proportion depends on the local conditions. For a light drilling fluid being used under well conditions such that gas-cutting is only slight, 0.5 per cent of ethyl acetate or its equivalent suffices. For denser muds or muds that are particularly susceptible to gas cutting, 1 to 2 per cent of the agent may be required. In general, if gas cutting in a mud takes place to an extent less than approximately 0.1 pound per gallon, the mud is considered, for practical purposes, to be free from tendency to gas cutting. A mud in which gas cutting is reduced to approximately this value is safe, and there is ordinarily little to be gained by attempting to reduce gas cutting to a lower figure. Muds in which gas cutting takes place to the extent of 0.5 pounds per gallon or more are considered quite subject to gas cutting, and if they are used in gassy wells there is danger of a blow-out. In general, approximately 1 per cent of agent is sufficient for treatment of the mud fluid to insure effective release of gas therefrom.

In operation the mud fluid is circulated down the bore, around the drilling tool, up the bore and out in the usual way. When the fluid is returned to the surface pressure on the fluid is released and it is passed through a settling zone such as an open ditch or pool, where the flow is retarded and entrained matter allowed to settle out. Gas is extricated from the fluid in this zone. After settling the fluid is generally treated with more chemical agent and returned to the well.

In examples of our invention as applied to small samples of drilling muds subjected to gas cutting conditions, the sample of mud fluid was weighed and then subjected, under constant agitation, to methane gas (natural gas) under a pressure of 500 pounds per square inch, for an hour. Pressure was then gradually released from the sample fluid to atmospheric pressure, simulating the conditions existing in a well as the drilling fluid moves upward toward the surface. The sample of mud was again weighed and the weight of unit volumes of fluid before and after the gas treatment compared. The loss in density in pounds per gallon was recorded. Comparisons were made in this manner between untreated muds, and muds treated with small proportions of our surface-tension-reducing agents. The surface tension of the untreated and the corresponding treated mud was measured in each case; and also the viscosity.

The following table shows the effect of treatment with ethyl acetate on the gas cutting of a number of rotary drilling muds. The measured relative viscosities of the mud, and their measured surface tensions are also given, for the sake of comparison.

Relation of the gas cutting of rotary drilling fluids to their surface tension

| Drilling fluid | Density; lbs./gal. | Relative viscosity at 77° F.; centipoises | Surface tension at 77° F.; dynes/cm | Degree of gas cutting; lbs./gal. |
|---|---|---|---|---|
| Lagunita mud (clay) | 9.25 | 2.5 | 72.6 | 0.46 |
| Lagunita mud, plus 1% ethyl acetate by volume | 9.2 | 2.5 | 66.2 | 0.06 |
| Miraflores mud (clay) | 9.4 | 2.0 | 75.2 | 0.40 |
| Miraflores mud plus 1% ethyl acetate by volume | 9.2 | 2.0 | 66.6 | 0.00 |
| Lagunita mud (clay) 729 parts by weight of weighting solids; 396 parts by weight of clay solids; 2180 parts by weight of water | 12.35 | 17.0 | 72.4 | 0.31 |
| Lagunita mud (clay) 729 parts by weight of weighting solids; 396 parts by weight of clay solids; 2180 parts by weight of water; plus 1% ethyl acetate by volume | 12.3 | 17.0 | 69.9 | 0.05 |
| "Petrolea 1A" (clay) | 10.2 | 18.0 | (not measured) | 0.91 |
| "Petrolea 1A" plus 0.5% ethyl acetate by volume | 10.2 | 18.0 | (not measured) | 0.10 |

"Petrolea 1A" is a mud containing substances adapted to impart to it a low viscosity.

It will be observed in each case that the addition of the ethyl acetate caused a considerable reduction in surface tension, and a remarkable reduction of gas cutting, while having no measurable effect on the viscosity of the mud.

The following table illustrates the effect of extent of gas cutting of a particular drilling mud, of treatment with certain alcohols according to the invention.

| | Relative viscosity; centipoises | Surface tension; dynes/cm | Degree of gas cutting lbs/gal. |
|---|---|---|---|
| Mud before treatment | 20 | 72.2 | 0.5 |
| Mud after treatment with 2% ethyl alcohol by volume | 20 | 64.8 | 0.03 |
| Mud after treatment with 1% isopropyl alcohol by volume | 20 | 64.1 | 0.04 |
| Mud after treatment with 1% isoamyl alcohol by volume | 20 | 44.1 | 0.04 |

Our invention is applicable to any mud, either of the colloidal or semi-colloidal type or of the non-colloidal type. Gas cutting is reduced to a low degree, and the dangers attending gas cutting minimized. Use of long settling ditches or big pools, and of mechanical separating devices, is obviated. Simple settling troughs suffice for substantially complete extrication of gas in a short time.

What we claim is:—

1. An improved method of drilling wells through gas-bearing strata by means of a drill wherein a mud fluid is admixed with a modicum of a colloidally neutral organic agent adapted to lower the surface tension of the liquid content of the fluid while not substantially affecting other properties of the fluid, the fluid is pumped down the well, around the drill and up out of the well, the mud fluid is then freed of entrained gas by release of pressure on the fluid and is returned to the well substantially freed of entrained gas.

2. An improved well drilling fluid having a reduced surface tension and adapted to allow entrained gas to be freed readily on release of pressure from the fluid, the said fluid comprising a fluid suspension of solid particles containing a modicum of a colloidally neutral water soluble organic reagent adapted to reduce the surface tension of the fluid while not substantially affecting the other properties of the fluid.

3. The fluid of claim 2 wherein the suspension contains in solution a modicum of a neutral, oxygen-containing, water soluble organic material of the class known as volatile solvents.

4. The fluid of claim 2 wherein the suspension contains a modicum of an ester in solution.

5. The fluid of claim 2 wherein the suspension contains a modicum of ethyl acetate in solution.

6. The fluid of claim 2 wherein the suspension contains an alcohol in solution.

7. The fluid of claim 2 wherein the suspension contains a modicum of a ketone in solution.

HENRY A. AMBROSE.
ALBERT G. LOOMIS.